United States Patent Office 3,485,634
Patented Dec. 23, 1969

3,485,634
DISSOLVING DYES BY ULTRASONICS
Jeffrey M. Owen, Stanmore, and Margaret A. Wright, South Harrow, England, assignors to Eastman Kodak Company, Rochester, N.Y., a corporation of New Jersey
No Drawing. Filed Apr. 25, 1966, Ser. No. 544,820
Int. Cl. G03c 1/22, 1/18, 1/16
U.S. Cl. 96—102      2 Claims

ABSTRACT OF THE DISCLOSURE

Photographic spectral sensitizing dyes are dissolved by subjecting a mixture of the dye and a solvent therefor to ultrasonic vibrations. Photographic silver halide emulsions are spectrally sensitized by subjecting a mixture of a spectral sensitizing dye in a solvent therefor to ultrasonic vibrations to dissolve the dye; and, adding the solution of dye to a photographic silver halide emulsion.

---

This invention relates to spectral sensitizing dyes, and more particularly to an improved process for dissolving photographic spectral sensitizing dyes. It also relates to processes for incorporating spectral sensitizing dyes in photographic emulsions.

In accordance with the prior art processes, spectral sensitizing dyes have been dissolved by combining a mixture of the dye and a solvent for the dye, and subjecting the mixture to elevated temperatures. Generally, since these dyes are quite insoluble even in organic solvents, prolonged heating is necessary to dissolve the dye. An improved method for dissolving spectral sensitizing dyes is desirable since such dyes are frequently damaged when heated for any substantial length of time.

We have found a new process for dissolving spectral sensitizing dyes rapidly at low temperatures, and a new process for incorporating spectral sensitizing dyes in photographic emulsions.

One object of this invention is to provide a novel process for dissolving spectral sensitizing dyes. Another object of this invention is to provide a process for dissolving spectral sensitizing dyes at low temperatures. A further object of this invention is to provide a novel process for dissolving spectral sensitizing dyes in shorter times than prior art procedures. Still another object of this invention is to provide a novel process for dissolving spectral sensitizing dyes which does not adversely affect the sensitizing characteristics of the dye. A further object of this invention is to provide a novel process for incorporating spectral sensitizing dyes in photographic emulsions. Other objects of the invention will be apparent from this disclosure and the appended claims.

In accordance with one embodiment of this invention, spectral sensitizing dyes are dissolved by combining the dye in a solvent therefor, and subjecting the mixture of dye and solvent to ultrasonic vibrations. We have found that this process for dissolving dyes is rapid, may be carried out at low temperatures and does not result in damage to the sensitizing properties of the dye. If desired, a combination of two or more dyes may be dissolved simultaneously in accordance with the invention.

In another embodiment of this invention a novel process is provided for incorporating spectral sensitizing dyes in photographic emulsions which features combining the dye and a solvent therefor, subjecting the mixture of dye and solvent to ultrasonic vibrations until the dye is dissolved, and then combining the solution of dye in solvent with a photographic emulsion. As an alternative to this process, the solution of dye in solvent, which may be water miscible, water immiscible or partially water immiscible, may be added to a hydrophilic colloid free from silver halide, preferably at elevated temperature, and then adding the dye in hydrophilic colloid, preferably after cooling, to a silver halide emulsion.

Advantageously, the processes of this invention are carried out below 100° F., and preferably at about room temperature, such as from 60 to 80° F. Higher temperatures may be used if desired, providing the dye is not adversely affected by such temperatures. Any temperature is operable which allows the dye to be dissolved without damage to its sensitizing properties.

It is sometimes desirable to place the mixture of dye and solvent in a container capable of transmitting ultrasonic vibrations. The container with the dye and solvent is then placed in a liquid and the liquid is subjected to ultrasonic vibrations. During operation the liquid is preferably cooled, or cool liquid is recycled so that the mixture of dye and solvent is maintained at a relatively low temperature. Advantageously, the walls of the container are good heat conductors to allow the mixture of dye and solvent to be cooled by the liquid.

The ultrasonic equipment in carrying out the invention is commercially available. Good results are obtained when the mixture of dye and solvent are subjected to ultrasonic vibrations in the range of about 20,000 to 100,000 cycles per second.

As used herein and in the appended claims, the term spectral sensitizing dyes refers to compositions which extend the response of photosensitive materials to radiation to which the material normally is substantially insensitive. Such materials include silver halide, such as silver chloride, silver bromide, silver chlorobromide, etc., organic photoconductors, such as those disclosed in U.S. Patents 3,041,165; 3,037,861; and 3,112,197; inorganic photoconductors such as $TiO_2$ and $ZnO$, and radiation-sensitive polymers such as those described in U.S. Patent 3,030,208. These radiation-sensitive materials may be dispersed in a binder, such as gelatin, polyvinyl alcohol and other hydrophilic colloids. Binderless coatings of such materials may be sensitized by bathing in solutions of dyes provided in accordance with the invention. Especially useful are dyes which spectrally sensitize photographic silver halide within the range of between 3,000 and 12,000 A.

This invention is applicable to dissolving spectral sensitizing dyes which are difficult to dissolve in organic solvents at room temperature. Spectral sensitizing dyes with which this invention is especially concerned generally have a solubility in water or organic solvents (at 20° C.) of less than about 1%. Among the useful spectral sensitizing dyes are the cyanine dyes, the hemicyanine or merocyanine dyes, e.g., merocyanines derived from 2,5-dihydroxyquinone, oxonol dyes, styryl dyes and the like, such as:

3,3'-diethylthiacarbocyanine iodide;
1',3-diethyl-7-methylthia-2'-cyanine iodide;
2,p,dimethylaminostyrylbenzothiazole ethiodide;
[2-(3-ethylthiazoline)] [4-(2-acetamino-5(4)thiazo-lone]dimethinemerocyanine;
oxonol dyes such as 3-hydroxy-3'-oxy-2,2'-methenyldithionaphthene; phthaleins such as erythrosine;

and other dyes containing the amidinium-ion-auxo-chromophore system, such as rhodamine, pinacyanol and pinaflavol. Other useful dyes are described in Brooker U.S. Patents 1,846,301, issued Feb. 23, 1932; 1,846,302, issued Feb. 23, 1932; and 1,942,854, issued Jan. 9, 1934; White U.S. Patent 1,990,507 issued Feb. 12, 1935; Brooker and White U.S. Patents 2,112,140, issued Mar. 22, 1938; 2,165,338, issued July 11, 1939; 2,493,747, issued Jan. 10, 1950, and 2,739,964, issued Mar. 27, 1956; Brooker and Keyes U.S. Patent 2,493,748, issued Jan. 10, 1950; Sprague U.S. Patents 2,503,776, issued Apr. 11, 1950, and 2,519,001, issued Aug. 15, 1950; Heseltine and Brooker U.S. Patent 2,666,761, issued Jan. 19, 1954; Heseltine U.S. Patent 2,734,900, issued Feb. 14, 1956; Van Lare U.S. Patent 2,739,149, issued Mar. 20, 1956; and Kodak Limited British Patent 450,958, accepted July 15, 1936.

This invention is useful in dissolving spectral sensitizing dyes in a wide variety of solvents. The solvents may be water miscible, water immiscible or partially water immiscible. Typical useful solvents include lower alcohols such as methanol and ethanol, acetic acid, ethyl acetate, benzene phenoxyphenol and mixtures thereof. It should be noted that in accordance with the processes of this invention, no change is required in the concentrations of dye and solvent from those employed in conventional procedures for dissolving dyes. The invention, rather, provides a reduction in time and temperature required to dissolve the dye. The time required to obtain solution with ultrasonic techniques depends, of course, upon the solubility of the particular dye being used, and thus varies considerably.

This invention will be further illustrated by the following examples.

Example 1 shows a process for dissolving a relatively soluble dye in accordance with the invention.

EXAMPLE 1

The spectral sensitizing dye anhydro-(5-chloro-3-ethyl-2-benzothiazole)(5 - chloro-3-3'-sulfobutyl-2-benzothiazole)-β-ethyl-trimethinecyanine hydroxide (0.5 mg.) is added to 100 ml. methyl alcohol. The mixture of dye and solvent is incorporated in a glass flask and placed in the water tank of disontegrator 80-watt generator manufactured by Ultrasonics Industries Inc. This generator has an output of 80 kc./s. and supplies ultrasonic energy to a one-half gallon capacity tank. The generator is adjusted for maximum excitation and a continuous flow of water is passed from the tank to keep the temperature of the mixture of dye and solvent at about 70° F. The dye is fully dissolved in the methyl alcohol after one minute. It takes forty minutes to dissolve the dye by conventional techniques in methyl alcohol by heating at 135° F. With continued heating after about 60 minutes at 135° F., the dye starts to decompose and has a lower maximum absorption than the solution of dye dissolved using ultrasonic agitation.

Example 2 shows the method of dissolving a sparingly soluble dye.

EXAMPLE 2

The procedure of Example 1 was followed except that the dye employed is 3-carboxymethyl-5-(3-methylthiazolidin - 2 - ylideneprop-2'-ylidene)-2-thiothiazolid-4-one. Using the ultrasonic technique of the invention, 25 minutes are required for completely solubilizing 0.5 mg. of the dye in 100 ml. methyl alcohol. It takes 2 hours to dissolve 0.5 mg. of the dye in 100 ml. methyl alcohol with heating at 135° F. The sensitizing maximum of the two solutions of dye are different, it appearing that the long heating of the dye in the one case causes breakdown of the dye before it dissolves completely.

EXAMPLES 3–8

Following the procedure of Example 1, the following spectral sensitizing dyes (0.5 mg.) are dissolved rapidly at low temperatures (under 100° F.) in 100 ml. methanol (except Dye 3 wherein 100 ml. phenoxyethanol was used instead of methanol).

(3) 5-[(1-ethyl-2(1) - β - naphthothiazolylidene)-α-phenyl-ethylidene] - 3 - β - methoxyethyl-2-(3-β-methoxyethyl-4-oxo-2-thiono - 5 - thiazolidylidene)-4-thiazolidone.

(4) 2 - [(2-benzothiazolyl ethiodide)methylene]-3-β-methoxy - ethyl-5[(1-methyl-2(1H)-naphtho[1,2]thiazolylidene)-α-phenylethylidene]-4-thiazolidinone.

(5) 5 - [di(1 - ethyl-2(1H)-β-naphthothiazolylidene) isopropylidene]-1,3-di(β-methoxyethyl)barbituric acid.

(6) Anhydro - 9-ethyl-3,3'-di(3-sulfopropyl)-4,5',4',5'-dibenzothiacarbocyanine hydroxide, sodium salt.

(7) Bis - [3 - methyl - 1-p-sulfophenyl-5-pyrazolone-(4)]-pentamethinoxonol.

(8) 2,2-diethylselenadicarbocyanine iodide.

Each of these solutions is used to sensitize gelatin silver bromoiodide emulsions (95 mole percent bromide and 5 mole percent iodide) at a concentration of 40 mg. dye per mole of silver. Good sensitizing results are obtained. Typical useful dye concentrations are from .02 to 3.0 grams per mole of silver.

It has also been found that in addition to spectral sensitizing dyes, other emulsion addenda, which are difficultly soluble in water or organic solvents, may be advantageously dissolved by combining the addenda with solvent and subjecting the solvent and addenda to ultrasonic vibrations. This allows fast, low temperature dissolving of the addenda. Typical addenda which may be dissolved by this technique include ultraviolet absorbers, e.g., 3-cetyl-2-phenylimino-5-benzal thiazolidone; antifoggants, e.g., 1,4-bis(acetoxymethyl)-2,3,5,6-tetraphenylbenzene and 5-(4-cyanophenyl)tetrazole monohydrate; anti-plumming agents, such as 2-hydroxy-4-methyl-5-chlorothio-glycolic anilide and 2-(thioglycolylamido) benzotriazole; antioxidants, such as dioctylhydroquinone and, other materials, such as polymers, e.g., copoly(ethyl acrylate-acrylic acid) and polyvinyl alcohol. Hence, the processes of the invention are broadly applicable to dissolving photographic reagents or addenda which are substantially water insoluble and difficultly soluble in organic solvent.

Although the invention has been described in considerable detail with particular reference to certain preferred embodiments thereof, it will be understood that variations and modifications can be effected within the spirit and scope of the invention as described hereinabove, and as defined in the appended claims.

We claim:

1. The method of spectrally sensitizing a photographic silver halide emulsion which comprises:

(a) dissolving a photographic spectral sensitizing dye selected from the group consisting of a cyanine dye and a merocyanine dye, in a solvent in which the dye has a solubility of less than about 1% at 20° C., by subjecting a mixture of the dye and solvent to ultrasonic vibrations in the frequency range of about 20,000 to about 100,000 cycles per second, for a time sufficient to completely dissolve the dye in the solvent; and, (b) adding the solution of dye in solvent to a flowable, liquid photographic silver halide emulsion to spectrally sensitize the silver halide.

2. The method of spectrally sensitizing a photographic silver halide emulsion which comprises:

(a) dissolving the photographic spectral sensitizing dye anhydro - (5 - chloro - 3-ethyl-2-benzothiazole)(5-chloro - 3,3' - sulfobutyl - 2-benzothiazole)-β-ethyltrimethinecyanine hydroxide in a solvent in which the dye has a solubility of less than about 1% at 20° C., by subjecting a mixture of the dye and solvent to ultrasonic vibrations in the frequency range of about 20,000 to about 100,000 cycles per second, for a time sufficient to completely dissolve the dye in the solvent; and, (b) adding the solution of dye in solvent to a flowable, liquid photographic silver halide emulsion to spectrally sensitize the silver halide.

References Cited

UNITED STATES PATENTS 2,336,843  12/1943  Brooker et al. _____ 96—106

(Other references on following page)

OTHER REFERENCES

Newell: Textile World, pp. 90–92, January 1950.
AD Report 27,578: "The Application of Ultrasonics In the Manufacture of Dispersion-Type Photographic Emulsions," February 1954.

J. TRAVIS BROWN, Primary Examiner

U.S. Cl. X.R.

96—106